Patented Oct. 31, 1944

2,361,560

UNITED STATES PATENT OFFICE 2,361,560

BLACK TETRAKISAZO DYESTUFFS

Mordecai Mendoza, Blackley, Manchester, England, assignor to Imperial Chemical Industries Limited, a corporation of Great Britain No Drawing. Application September 2, 1941, Serial No. 409,271. In Great Britain September 4, 1940

2 Claims. (Cl. 260—168)

This invention relates to the manufacture of new black tetrakisazo dyestuffs and also to the application of the dyestuffs in dyeing leather.

According to the invention we make the dyestuffs by the process which comprises (a) coupling in alkaline medium 1 molecular proportion of a tetrazotised 4:4'-diaminodiphenyl, which may carry chloro, methyl or methoxy substituents in one or both 3 and 3' positions, with 1 of the monoazo compound obtained by coupling in acid medium a diazotised amine of the benzene series with 1:8-aminonaphthol-3:6-disulphonic acid (i. e. H acid), and then (b) either (i) coupling with 1 molecular proportion of a monoazo compound obtained by coupling a diazotised amine of the benzene or naphthalene series with 1 molecular proportion of m-phenylenediamine or m-toluylenediamine or (ii) coupling firstly with 1 molecular proportion of m-phenylenediamine or m-toluylenediamine and secondly with 1 of a diazotised amine of the benzene or naphthalene series.

The new dyestuffs are primarily of interest for the dyeing of leather. They have very good affinity for leather of all tannages and a capacity to build up black shades with good penetration. The dyeings exhibit good stability towards acids and are very fast to light. They are free from the defect of bronzing. Their excellent properties can be illustrated by the dyestuff sulfanilic acid→m - phenylenediamine←benzidine→H acid←sulfanilic acid. This dyestuff yields full bloomy blacks on full chrome suede leathers with very good penetration and light fastness and with no tendency to bronziness. It is superior to similar dyestuffs already in use. The dyestuff also gives very level dyeings on vegetable-tanned leathers which it dyes in black and grey shades.

The invention also includes the application of the new dyestuffs in the dyeing of leather.

It will be noticed that a necessary feature of the process of manufacturing the dyestuffs is that the H acid is coupled first with a diazotised amine and then with a tetrazotised 4:4'-diaminodiphenyl. While it is very well known to couple H acid first with a tetrazotised 4:4'-diaminodiphenyl and then with a diazotised amine, the order of coupling used in this invention is almost or entirely novel in making tetrakisazo dyestuffs.

The following examples, in which parts are by weight, illustrate but do not limit the invention.

Example 1

To the mineral acid suspension of the diazo derivative obtained in the customary manner from 17.3 parts of sulphanilic acid by means of hydrochloric acid and 6.9 parts of sodium nitrite, a neutral solution of 36.3 parts of the disodium salt of 1:8-aminonaphthol-3:6-disulphonic acid in 200 parts of water is added over about one hour with good stirring at a temperature of 15° C. and coupling is allowed to complete in the course of 4-5 hours. Then, by means of external cooling the temperature is lowered to 5° C. and the tetrazo compound obtained from 18.4 parts of 4:4'-diaminodiphenyl by means of 13.6 parts of sodium nitrite and hydrochloric acid is added and followed by sufficient sodium carbonate to make the mixture slightly alkaline to litmus. The disazo combination is complete in about half an hour.

To the diazo disazo product so obtained an aqueous solution of 10.8 parts of m-phenylenediamine in 200 parts of water is added and formation of the trisazo compound is allowed to proceed to completion over about 3 hours.

At this stage a dull blue-black suspension is obtained. There is then added the diazo suspension obtained from 17.3 parts of sulphanilic acid and enough sodium hydroxide solution to give a permanent alkaline reaction to litmus. The final coupling is complete after about 12 hours' stirring and the dyestuff is isolated from the resulting solution by warming to 60° C. and adding sufficient hydrochloric acid to impart a faint mineral acid reaction and sufficient common salt to make approximately a 10% brine. The precipitated dyestuff is then filtered off, pressed well, dried and ground.

When dyed on full chrome suede leathers it yields bloomy black shades of good penetration and light fastness. There is no tendency to bronziness.

If in the final coupling the equivalent amount of naphthionic acid is substituted for the sulphanilic acid, a dyestuff of similar properties with a slightly greener shade is obtained.

Example 2

To the monoazo compound obtained as in Example 1 from 17.3 parts of sulphanilic acid and 36.3 parts of the disodium salt of 1:8-aminonaphthol-3:6-disulphonic acid there is added the tetrazo compound obtained in the usual manner from 24.4 parts of 3:3'-dimethoxy-4:4'-diaminodiphenyl followed by sufficient sodium carbonate to make the reaction faintly alkaline to litmus. Coupling is allowed to complete in the course of half an hour. A solution of 10.8 parts of m-phenylenediamine in 200 parts of water is added and formation of the trisazo dyestuff is complete in about three hours. There is then added the diazo suspension obtained from 22.3 parts of naphthionic acid and this is followed by sufficient sodium hydroxide solution until a permanent alkaline reaction to litmus is once more obtained. This final coupling is allowed to proceed for about 12 hours, when the new dyestuff is isolated by warming to 60° C. neutralising with hydrochloric acid and adding sufficient common salt to make an approximately 10% brine. The precipitated dyestuff is then filtered off, dried and ground.

When dyed on leather it gives much greener shades of black than the dyestuff of Example 1.

If in the final coupling the equivalent amount of p-nitroaniline is substituted for the naphthionic acid the resulting dyestuff dyes leather in somewhat redder shades of black.

I claim:

1. A tetrakisazo dye which in the form of its acid is represented by the formula

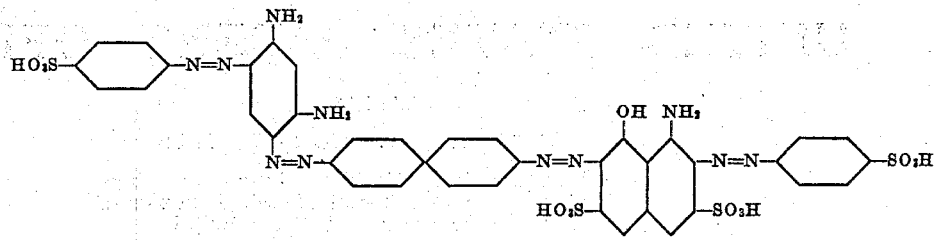

2. Process for the manufacture of a new black tetrakisazo dyestuff, which consists in coupling in alkaline meduim 1 molecular proportion of tetrazotised benzidine with 1 molecular proportion of the monoazo compound obtained by coupling in acid medium 1 molecular proportion of 1-amino-8-hydroxy-naphthalene-3:6-disulphonic acid with 1 of diazotised sulphanilic acid, coupling the resulting disazo compound with m-phenylenediamine and finally coupling with diazotised sulphanilic acid.

MORDECAI MENDOZA.